March 4, 1930.  C. G. RENTOS  1,748,997
CUTTING OR SLICING DEVICE
Filed May 3, 1927   3 Sheets-Sheet 1
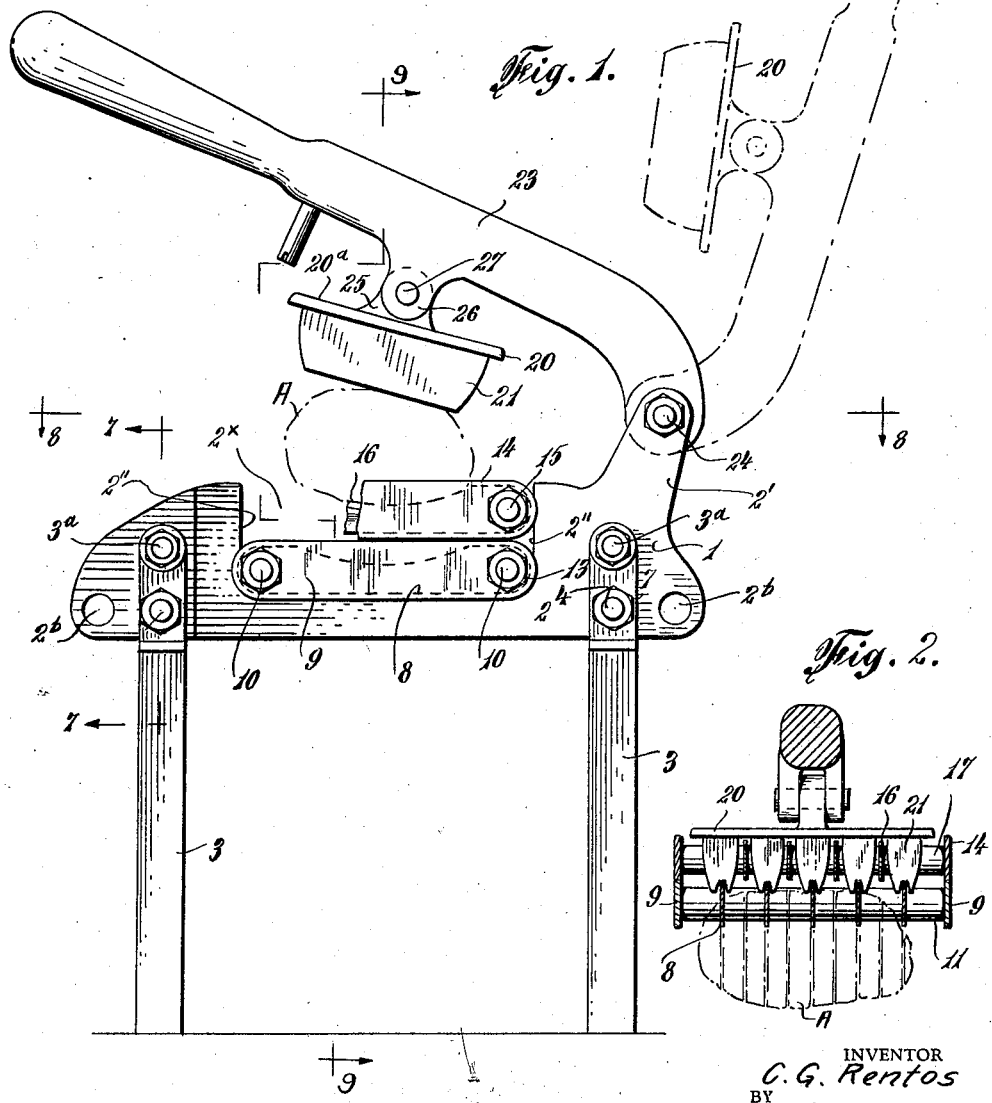

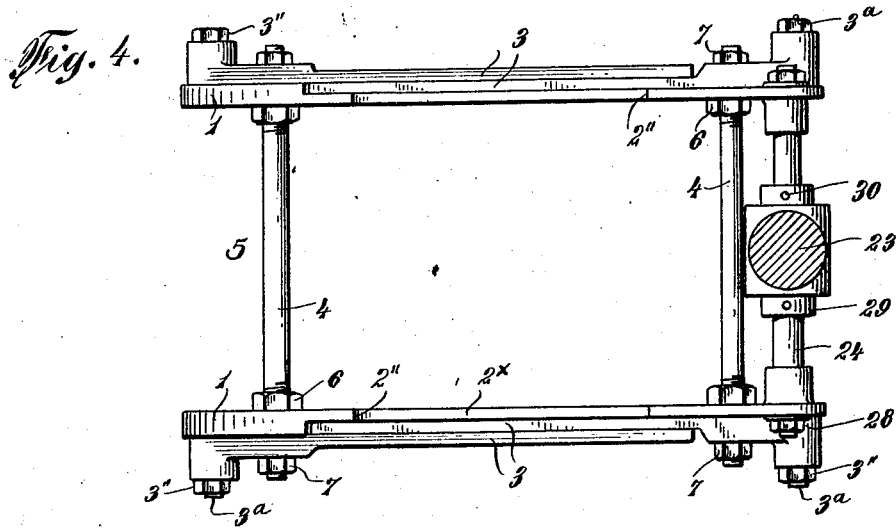
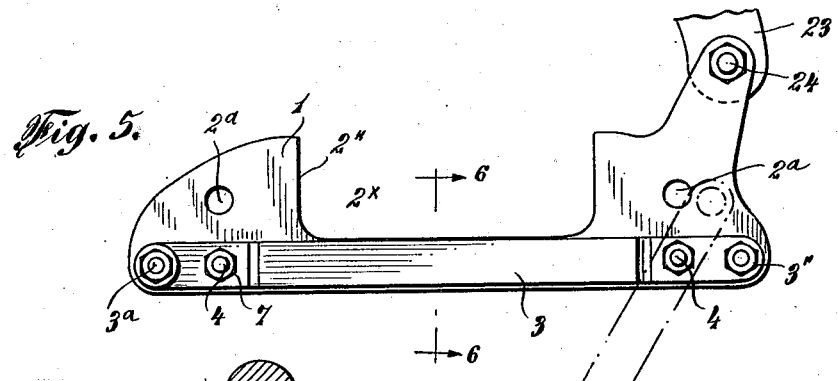
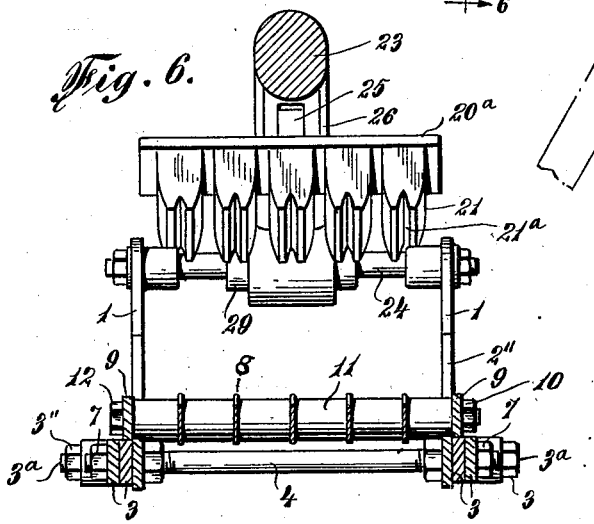
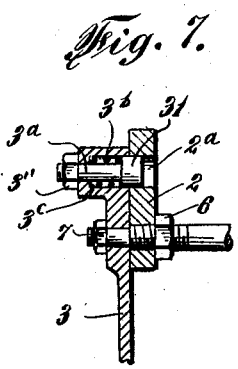

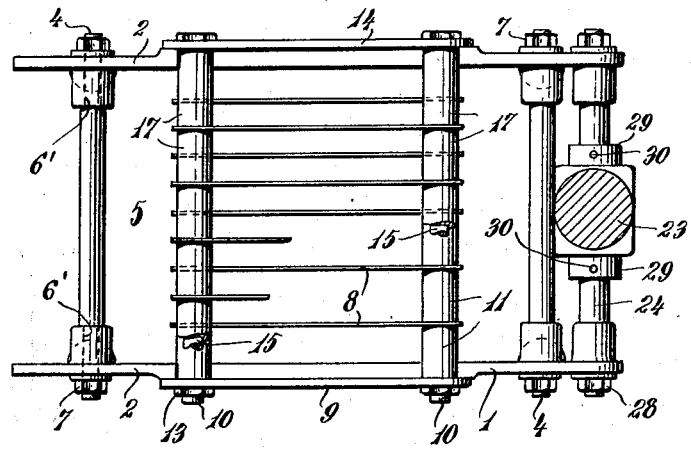
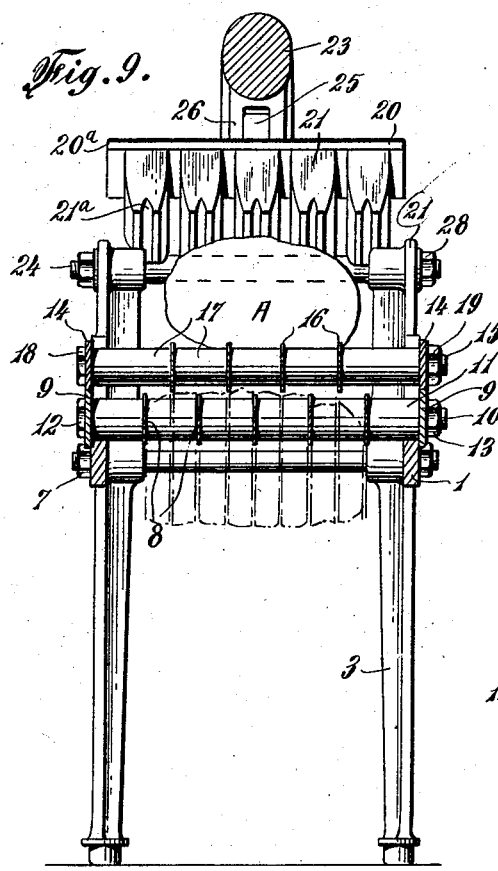
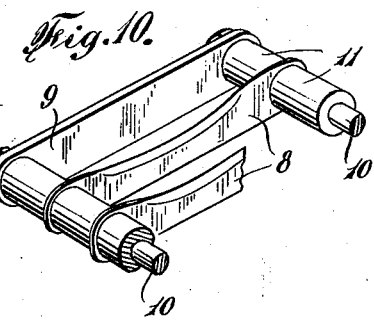
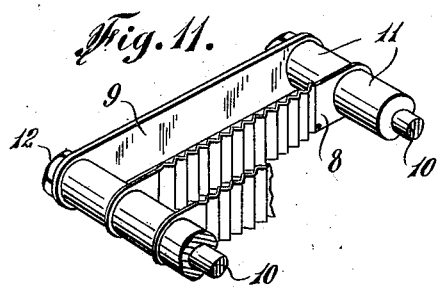

Patented Mar. 4, 1930

1,748,997

UNITED STATES PATENT OFFICE

COSTAS G. RENTOS, OF NEW YORK, N. Y.

CUTTING OR SLICING DEVICE

Application filed May 3, 1927. Serial No. 188,453.

The object of my invention is to provide a device or machine adapted for cutting or slicing various articles successively, such as vegetables, fruits and the like, into numerous slices expeditiously and without injury to the articles.

My invention comprises novel details of improvement that will be more fully hereinafter set forth and then pointed out in the claim.

Reference is to be had to the accompanying drawings forming a part hereof, wherein Fig. 1 is a partly broken side view of a cutting or slicing device embodying my invention;

Fig. 2 is a sectional detail showing the parts in cutting position;

Fig. 3 is a perspective detail of the article presser;

Fig. 4 is a plan view partly broken, the cutters being omitted and the legs folded;

Fig. 5 is a side view of Fig. 4;

Fig. 6 is a section on line 6, 6, in Fig. 5;

Fig. 7 is a sectional detail on line 7, 7, in Fig. 1;

Fig. 8 is a plan view partly broken and partly in section on line 8, 8, in Fig. 1;

Fig. 9 is a vertical section substantially on line 9, 9, in Fig. 1;

Fig. 10 is a perspective detail of one of the cutter members, and

Fig. 11 is a similar view of a modification.

Similar numerals of reference indicate corresponding parts in the several views.

The numeral 1 indicates a main frame adapted to support the cutters and the presser. The frame 1 is shown substantially in rectangular form and of an open variety shown comprising spaced side bars 2 having suitable legs 3 and transverse tie rods 4 securing the side bars in spaced relation providing an inner opening at 5, (Figs. 4 and 8). The rods 4 are shown provided with nuts at 6 in some views and stops or shoulders at 6' in Fig. 8, against the inner sides of the bars 2 and with nuts 7 against the outer sides of the said bars, whereby the latter are secured in operative relation. The legs 3 maintain the frame elevated above a table or other support on which the device rests for use, so that the cut or sliced articles A may drop below the frame.

In Figs. 1 to 7 the legs 3 are pivoted to fold along the side bars 2 of frame 1 to reduce the compass of the device when not in use, and said legs are to extend downwardly to support the frame for use. The legs are shown pivoted near their upper ends on the rods 4 and provided with spring-pressed locking pins $3^a$ adapted to enter spaced openings or holes $2^a$ in the side bars 2 to retain the legs extended for use (Figs. 1 and 7). The side bars 2 also have openings or holes $2^b$ to receive the locking pins $3^a$ to retain the legs in folded positions one in front of another along the outer sides of the bars 2, (Figs. 1, 4 and 5). The openings or holes $2^a$ and $2^b$ for each leg are suitably spaced apart to retain the corresponding legs in the folded or extended position. The springs $3^b$ illustrated are within recesses $3^c$ in the outer ends of the legs and bear against the bottoms of the recesses and against shoulders or heads $3'$ on the pins, (Fig. 7). Nuts $3''$ on the pins engage the legs to resist the springs. By pulling out the pins the legs may be swung from the folded positions, (Fig. 4), to the operative positions and the pins within the holes $2^a$ will retain the legs for use, (Figs. 1 and 7), and vice versa. If preferred the legs may be integral with or permanently attached to the side bars 2, as in Figs. 8 and 9.

At 8 are spaced cutters supported by the frame with their cutting edges exposed upwardly, the spacing between the cutters being of the desired width for slicing articles, such as vegetables, fruits and the like. The cutters are comprised in a member that is removable from the main frame and includes spaced side bars 9 connected together at their end portions by tie rods 10 having sleeve-like spacers 11 thereon on opposite sides of the cutters, the rods having heads 12 at one end and nuts 13 at the opposite end. The cutters 8 have holes receiving the rods 10 and the parts may be assembled in a rigid unitary form by sliding the spacers 11 and the cutters along the rods in successive relation and screwing up the nuts against the bars 9. The construction described permits ready replacement of the cutters when required. The upper edge portions of the frame bars 2 are recessed at 2ˣ, (Figs. 1 and 5), in such a way that the cutter member described may be placed in said recesses so as to rest on the side bars 2 and be opposed in a longitudinal direction by the upwardly extending edge portions 2″ of the recesses 2ˣ, and the side bars 9 of the cutter member extend outside of side bars 2 to keep said member from lateral displacement in the frame. A second cutter member, substantially similar to the first named cutter member, is also provided adapted to be placed upon the first named cutter member and having spaced cutters located in different positions with relation to the cutters 8. The second named cutter member is shown comprising spaced side bars 14, transverse rods 15 adjacent to the ends of said bars and passing through holes in spaced cutters 16, the rods 15 being provided with sleeve-like spacers 17 that are on opposite sides of and space the cutters 16 apart between the side bars 14, and the rods 15 have heads 18 at one end and nuts 19 at the opposite end, whereby the cutters 16 and spacers 17 are detachably clamped between the bars 14 in a unitary structure. The last named cutter member is adapted to be placed within the recesses 2ˣ of the main frame to be opposed by the side bars 2 and their edge portions 2″ and to rest upon the lower cutter member. In the example illustrated the side bars 14 of the upper cutter member rest upon the side bars 9 of the lower cutter member so that cutters of one member are supported on a level above the cutters of another member. The cutters 16 are so spaced within the corresponding cutter member as to be out of register with the cutters 8 and in register with the spaces between said cutters of the other cutter member, and thus the cutters of one member are in staggered relation to the cutters of the other member for appropriately slicing the articles A. The upper edges of some or all of the cutters may be concave to receive the articles A and tend to keep them from rolling along the cutters.

In order to force the articles A against the cutters I provide a presser, indicated at 20, which is movably supported over the cutters to be advanced toward and retracted from the same. The presser illustrated comprises a series of spaced projections 21 extending from a base or plate 20ᵃ, said projections being so located with respect to the cutters as to oppose the cutters of the lowermost member and to pass between the cutters of the upper member to force the articles A against and between the cutters, as illustrated in Fig. 2. The parts 20ᵃ and 21 may be cast in a single piece of metal or may be in separate pieces suitably secured together, if preferred. By preference the lower edges of the projections 21 are provided with longitudinal grooves 21ᵃ to receive the cutters 8 so as to force the articles A beyond the upper edges of the lower cutters, (Fig. 2). I have illustrated in Figs. 2 and 9 five cutters 8 and five projections 21 opposing said cutters and four cutters 16, although there may be any desired number of cutters and projections according to the desider character of the cutting and slicing of the articles A. The presser 20 is shown operatively carried by a movable member 23 shown in the form of an arm or lever pivotally supported upon the main frame upon a rod 24 carried by said frame. The presser 20 is shown pivotally carried by the member 23 so as to accommodate or conform itself to the shape of the articles A upon the cutters and to level itself over the cutters at the termination of a cutting stroke. The base 20ᵃ is shown provided with an apertured lug 25 located between jaws 26 on member 23 and pivoted to said jaws by a pivot pin 27 that passes through the jaws and the aperture of the lug. The rod 24 is secured between the upwardly extending portions 2′ of the side bars 2 of the main frame by means of nuts 28, and collars 29 are suitably secured, as by pins 30, (Figs. 4 and 8), to the rod 24 on opposite sides of member 23 to retain the same from lateral displacement and rotatively in proper position.

Assuming that potatoes are to be cut or sliced, the presser 20 will be raised so that a potato may be placed upon the upper cutters 16 and then the presser will be forced downwardly against the potato, pushing the latter downwardly against the cutters. The upper cutters 16 will first cut relatively wide slices from the potato by reason of the pressure of the projections 21 against the potato, and such slices will be forced against the lower cutters 8 which will slit or sever such wider slices into narrower slices. Any slices of the potato that remain suspended between the lower cutters will be forced therefrom by the succeeding potato that is being sliced, and so on as successive potatoes are sliced. The same mode of operation applies to other articles to be cut or sliced, such as suitable vegetables and fruits that are not too soft. If it is desired to cut the articles into wider slices or cuts than produced by the two superposed cutter members a single cutter member may be applied in the main frame, such as the member having the cutters 8, to oppose the projections 21 of the presser.

The shape of the cutters may be as desired, such as provided with plane sides, as illustrated in Figs. 2, 9 and 10, or some of the cutters may be corrugated or fluted, such as for producing corresponding shapes on the slices, as illustrated in Fig. 11. For instance, the lower cutters 8 may be corrugated or fluted in an upward direction and the upper cutters 16 may be plane or straight along their sides, in which event when potatoes are sliced one side of each slice will be smooth by passing the cutter 16, and the opposite side of the corresponding slice will be corrugated by passing the corrugated cutter. The slices may be placed upon the cutters and again sliced to cut them into smaller pieces.

By means of my improvement various articles may be expeditiously and successively cut or sliced by simply placing the articles upon the cutters and appropriately operating the presser, whereby time is saved over the usual cutting or slicing of such articles manually with a knife, and the slices are all substantially of the same character of slicing.

Having now described my invention what I claim is:—

A device of the character described comprising a frame having an inner opening, a cutter member provided with spaced cutters disconnected from one another between their ends, adapted to be removably supported upon the frame in register with said opening, a second cutter member provided with spaced cutters disconnected from one another between their ends, adapted to be located over the first named cutter member with the cutters of the second named member parallel with and above the first named cutters and out of vertical register therewith, the second named cutters being in register with the spaces between the first named cutters, a member pivotally supported by the frame to operate over the cutters, and a presser pivotally hung from said member to have unobstructed swinging motion in the plane of the cutters, said presser having projections to engage articles on the cutters, said projections being spaced to pass between the cutters of the second named member and located in position to oppose the cutters of the first named member, the pivotal supporting of the presser causing it to accommodate itself to the shapes of different articles on the cutters, the second named cutters operating to cut parallel slices from an article and the first named cutters operating to cut said slices into parallel pieces as the said projections pass between the second named cutters into engagement with the first named cutters.

COSTAS G. RENTOS.